United States Patent
Bales et al.

(10) Patent No.: US 7,453,995 B1
(45) Date of Patent: Nov. 18, 2008

(54) SIZING A COMMUNICATION LINK

(75) Inventors: Stephen R. Bales, Lee's Summit, MO (US); Renee Fleeman, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 724 days.

(21) Appl. No.: 11/035,113

(22) Filed: Jan. 13, 2005

(51) Int. Cl.
*H04M 15/00* (2006.01)

(52) U.S. Cl. .......................... 379/112.01; 379/112.06; 379/112.07; 379/112.08

(58) Field of Classification Search . 379/112.01–112.1, 379/219, 220.01, 221.01, 221.03, 221.05–221.07, 379/265.01–265.1; 370/230, 232, 233, 395.41
See application file for complete search history.

(56) References Cited

U.S. PATENT DOCUMENTS

| | | | | |
|---|---|---|---|---|
| 5,914,945 A | * | 6/1999 | Abu-Amara et al. | 370/329 |
| 6,333,979 B1 | * | 12/2001 | Bondi et al. | 379/219 |
| 6,549,515 B1 | * | 4/2003 | Sourani et al. | 370/232 |
| 7,126,914 B2 | * | 10/2006 | Blackburn | 370/233 |
| 7,173,907 B1 | * | 2/2007 | Weber et al. | 370/230 |
| 7,266,122 B1 | * | 9/2007 | Hogg et al. | 370/395.41 |
| 2006/0077962 A1 | * | 4/2006 | Wu et al. | 370/352 |

* cited by examiner

*Primary Examiner*—Ahmad F. Matar
*Assistant Examiner*—Nafiz E Hoque

(57) ABSTRACT

A method of sizing a communication link comprises: determining daily peak callers and daily calling time for plurality of days; determining a sizing factor that represents a slope of a line formed by plotting the daily peak callers against the daily calling time for the plurality of days; determining peak day calling time; multiplying the peak day calling time by the sizing factor to obtain peak day peak callers; determining a bandwidth per caller; multiplying the peak day peak callers by the bandwidth per caller to determine peak day peak bandwidth; and sizing the communication link to support the peak day peak bandwidth.

30 Claims, 5 Drawing Sheets

SIZING A COMMUNICATION LINK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication link sizing based on network calling data.

2. Description of the Prior Art

Communication networks include switching systems that transfer calls over communication links. The size of these communication links must be selected to support future call traffic. Future call traffic must be estimated to properly size the communication link.

The use of Erlang B/C is a current technique for sizing a communication link. Erlang B/C uses complex calculations to determine to the peak busy hour of the peak busy day, and then sizes communication links to support that peak busy hour. Unfortunately, Erlang B/C requires extensive data collection and processing equipment to implement. Erlang B/C also uses complex calculations that are difficult to teach to new analysts.

SUMMARY OF THE INVENTION

Examples of the invention include methods of sizing a communication link, communication networks and systems, and software products for the communication networks and systems.

Some examples of the invention include a method of sizing a communication link that comprises: determining daily peak callers and daily calling time for plurality of days; determining a sizing factor that represents a slope of a line formed by plotting the daily peak callers against the daily calling time for the plurality of days; determining peak day calling time; multiplying the peak day calling time by the sizing factor to obtain peak day peak callers; determining a bandwidth per caller; multiplying the peak day peak callers by the bandwidth per caller to determine peak day peak bandwidth; and sizing the communication link to support the peak day peak bandwidth.

In some examples of the invention, the daily calling time comprises daily calling hours and wherein the peak day calling time comprises peak day calling hours.

In some examples of the invention, determining the daily peak callers and the daily calling hours for the plurality of days comprises determining the daily peak callers and the daily calling hours for the plurality of days for a communication network.

In some examples of the invention, determining the daily peak callers and the daily calling hours for the plurality of days comprises determining the daily peak callers and the daily calling hours for the plurality of days for a switching system.

In some examples of the invention, determining peak day calling hours comprises determining peak day calling minutes.

In some examples of the invention, the sizing factor is between 0.07 and 0.09.

In some examples of the invention, determining the sizing factor that represents the slope comprises adjusting the sizing factor upwards from the slope to oversize the communication link.

In some examples of the invention, sizing the communication link comprises checking an existing size of the communication link.

In some examples of the invention, the communication link comprises at least one T1 connection.

In some examples of the invention, the communication link supports internet protocol telephony.

Some examples of the invention include a communication network that comprises at least one switching system and a link sizing system. The switching system is configured for coupling to a communication link and configured to transfer calling data. The link sizing system is configured to perform the methods described above.

Some examples of the invention include a software product for a link sizing system, wherein a communication network comprises at least one switching system configured for coupling to a communication link and configured to transfer calling data to the link sizing system. The software product comprises software and a storage system that stores the software. The software is configured to direct the link sizing system to perform the methods described above.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
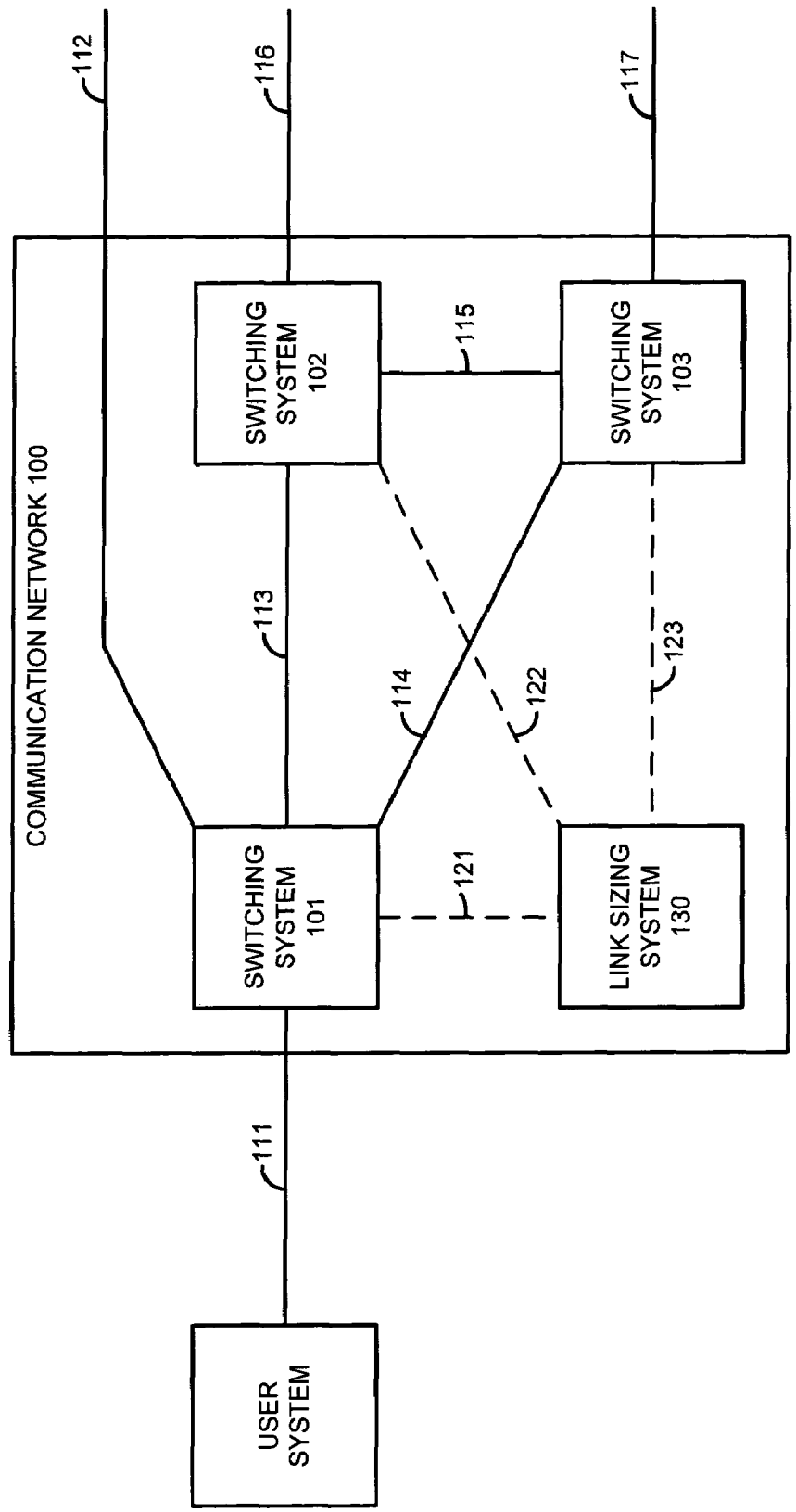
FIG. 1 illustrates a communication network in an example of the invention.

FIG. 1 illustrates communication network 100 in an example of the invention. Communication network 100 includes switching systems 101-103, communication links 111-117, data links 121-123, and link sizing system 130. Communication network 100 could include numerous other switching systems, links, and devices, but for clarity, these additional components are not shown on FIG. 1.

Switching system 101 is coupled to communication links 111-114 and data link 121. Switching system 102 is coupled to communication links 113, 115-116 and data link 122. Switching system 103 is coupled to communication links 114-115, 117 and data link 123. Link sizing system 130 is coupled to data links 121-123.

Switching systems 101-103 could be class 4 or 5 switches, packet telephony gateways, routers, border controllers, or the like. Communication links 111-116 could be switched trunks, such as Time Division Multiplex (TDM) links, packet links, optical links, wireless links, or the like. Communication links 111-116 could use protocols such as T1, DS3, Internet Protocol (IP), Ethernet, Synchronous Optical Network (SONET), Wave Division Multiplexing (WDM), Code Division Multiple Access (CDMA), and the like. Data links 121-123 could use the links and protocols listed above and may include intermediate systems that are not shown for clarity. The user system could be any source of user communications. User communication sessions are referred to herein as "calls" from "callers."

In operation, switching systems 101-103 exchange calls over communication links 111-112 and 116-117 with callers (or intermediate systems connected to the callers) that are external to network 100. Switching systems 101-103 exchange these calls with one another over communication links 113-115. Switching systems 101-103 transfer calling data to link sizing system 130 over data links 121-123. The data indicates a number of callers per time of day and a number of minutes for the calls per day. The days for which data are processed is referred to herein as the "sample."

Link sizing system 130 processes the data to determine the highest number of calling hours on any given day in the sample, which can be readily derived from the number of minutes for the calls per day. The highest number of calling hours on any given day in the sample is referred to herein as "peak day calling hours." Link sizing system 130 processes the data to determine the number of peak callers for each day. The number of peak callers for a given day is the highest number of simultaneous callers for that day. The number of peak callers for a given day is referred to herein as "daily peak callers." Link sizing system 130 also processes the data to determine a total hours of calling for each day, which can be readily derived from the number of minutes for the calls per day. The total hours of calling for each day is referred to herein as "daily calling hours."

Figure 2:
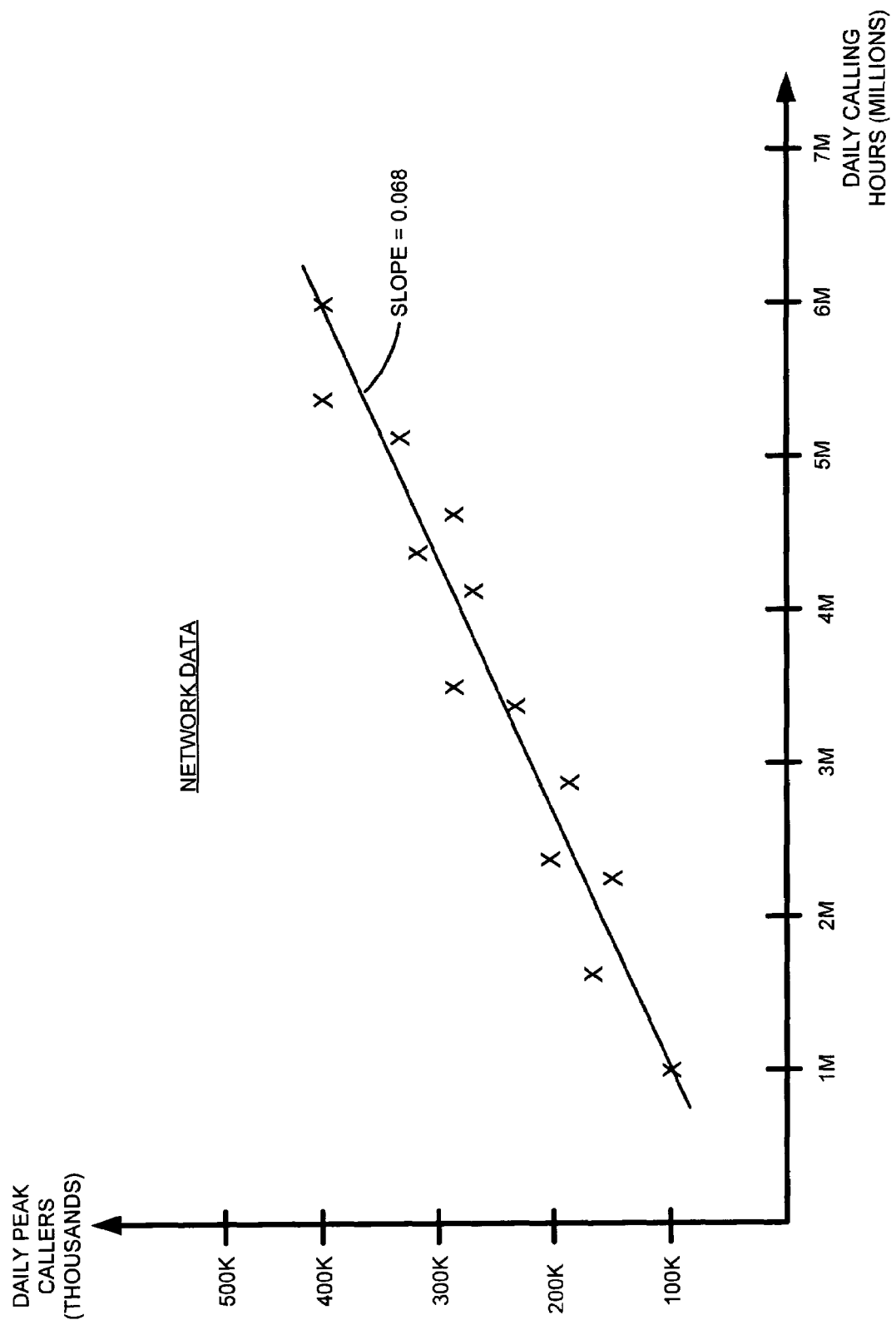
FIG. 2 illustrates a graph in an example of the invention.

FIG. 2 illustrates a graph in an example of the invention. The graph has daily peak callers as the vertical axis and daily calling hours as the horizontal axis. Each "x" mark on the graph indicates the daily peak callers and the daily calling hours for a given day. A series of x marks (days of data) reveals a correlation between daily peak callers and daily calling hours that can be quantified by the slope of a line formed by the x marks. On FIG. 2, the slope of this line is 0.068 daily peak callers per daily calling hours. Note that FIG. 2 is based on data for communication network 100.

Figure 3:
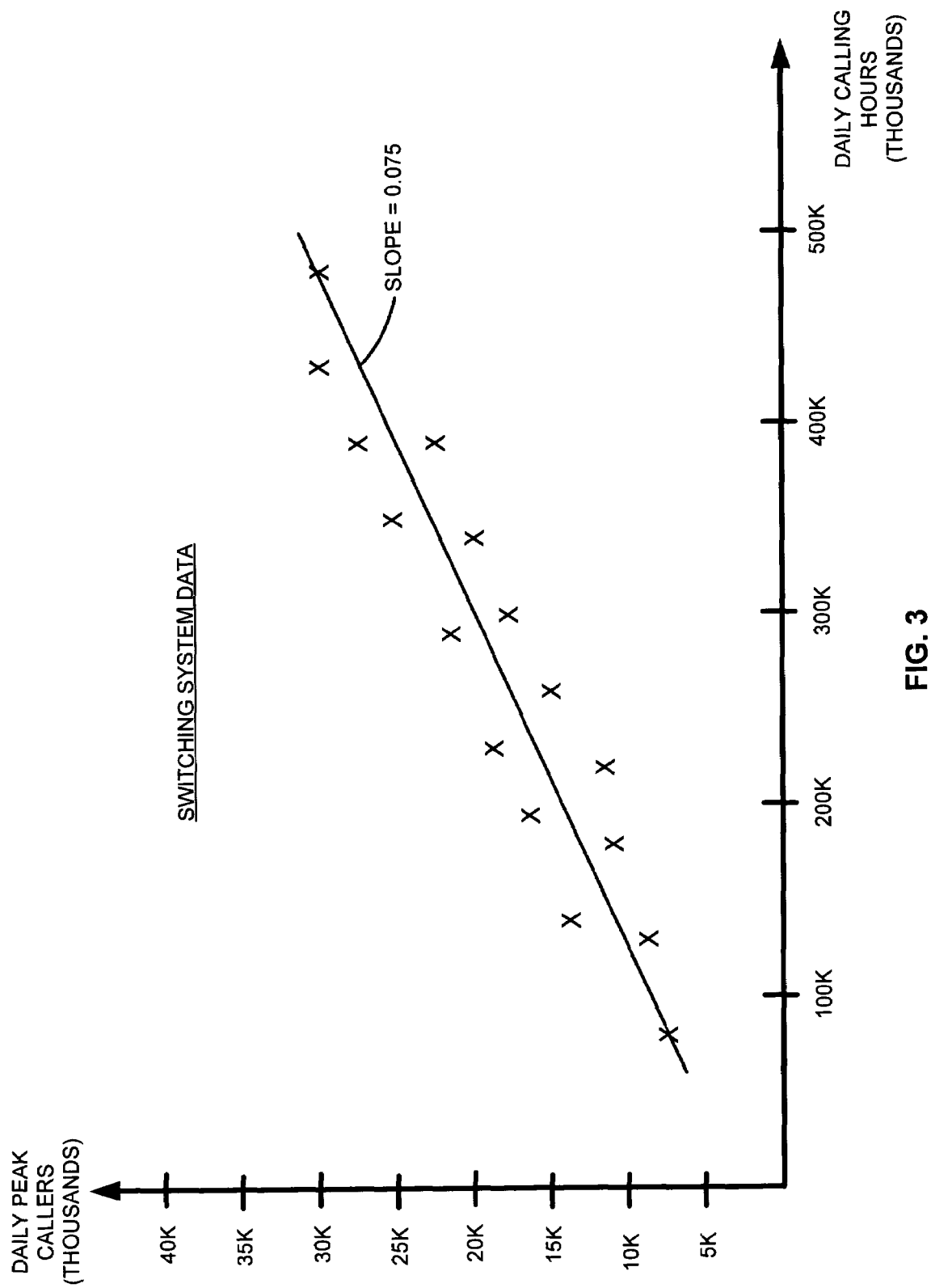
FIG. 3 illustrates a graph in an example of the invention.

FIG. 3 illustrates another graph in an example of the invention. The graph of FIG. 3 is similar to that of FIG. 2, except that the graph of FIG. 3 is based on data for switching system 101. On FIG. 3, the slope of the line is 0.075 daily peak callers per daily calling hours.

Link sizing system 130 processes the slope and the peak day calling hours to determine the number of peak callers on the peak day. The number of peak callers on the peak day is referred to herein as "peak day peak callers." Link sizing system 130 processes the number of peak callers with the expected bandwidth per caller to determine the amount of bandwidth needed for the peak day peak callers. This amount of bandwidth is referred to herein as "peak day peak bandwidth." The communication link is then sized to support the peak day peak bandwidth.

Figure 4:
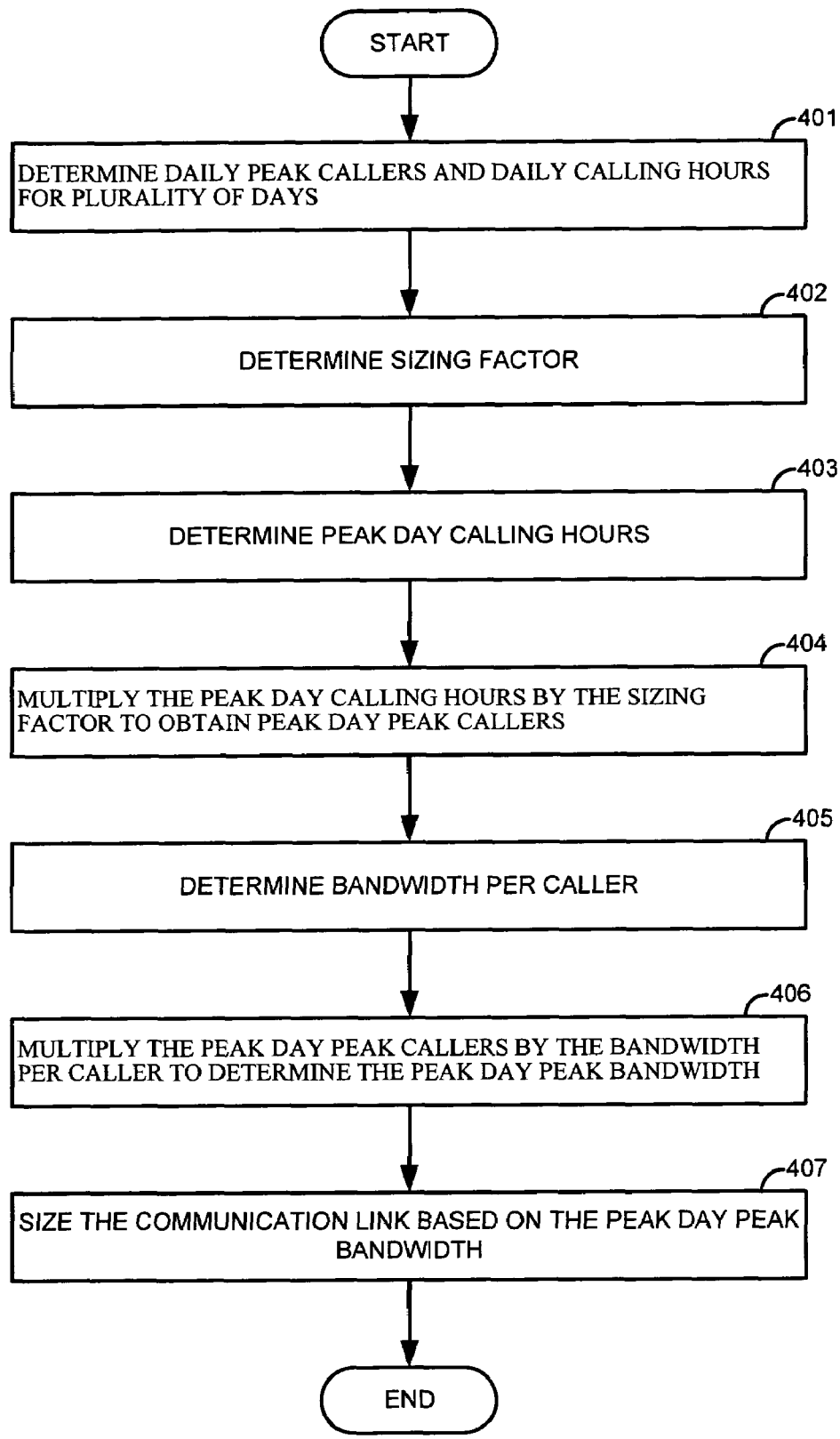
FIG. 4 illustrates a method of sizing a communication link in an example of the invention.

FIG. 4 illustrates a method of sizing communication link 111 in an example of the invention. The method could be implemented in whole or in part by link sizing system 130. The reference numbers from FIG. 4 are indicated parenthetically below.

The daily peak callers and daily calling hours are determined for plurality of days (401). A sizing factor is determined, where the sizing factor represents a slope of a line formed by plotting the daily peak callers against the daily calling hours for the plurality of days (402). If desired, the sizing factor may be adjusted upward to oversize the link and provide extra link capacity. For example, the sizing factor could be adjusted by upward by 20%. Peak day calling hours are determined (403). The peak day calling hours are multiplied by the sizing factor to obtain peak day peak callers (404). The bandwidth per caller is determined (405). For example, on a T1 line, each caller would require 64 kilobits per second bandwidth, but on an IP telephony line with compression, each caller may only require 16 kilobits per second bandwidth. The peak day peak callers are multiplied by the bandwidth per caller to determine the peak day peak bandwidth (406). The communication link is sized to support the peak day peak bandwidth (407).

The method could be applied with network data or with switch site data. For example, to size communication link 111, data from only switching system 101 may be used. To size communication link 113, data from all of network 100 may be used, or data from only switching systems 101-102 may be used.

The method above uses hours as the time increment, but other time increments could be used.

The method could use data from various selections of days. Since weekdays are typically busier than weekends, only weekday data may be used in the sample. Days that may skew the results, such as holidays, may be omitted from the sample. For example, the sample could include weekdays, excluding holidays, for the past 12 weeks. Thus, the method could be periodically performed to check the sizing of existing communication links based on pertinent data from the past 12 weeks.

Figure 5:
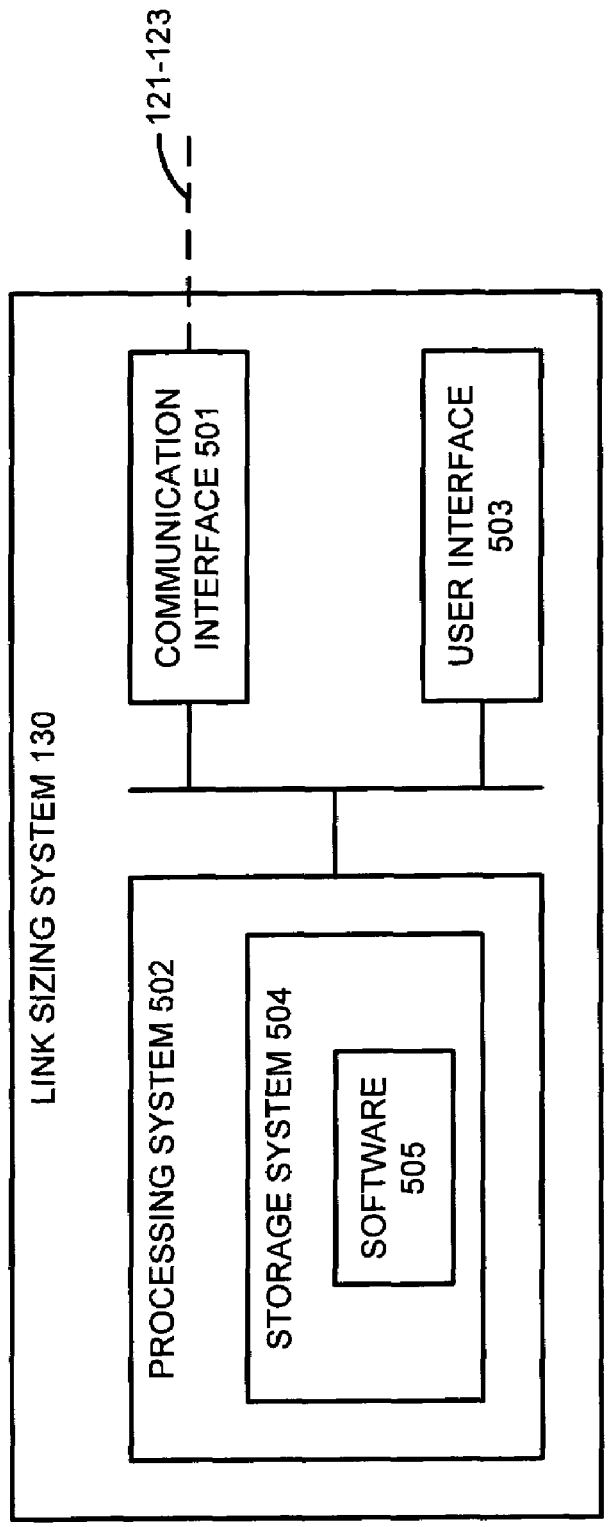
FIG. 5 illustrates a link sizing system in an example of the invention.

FIG. 5 illustrates link sizing system 130 in an example of the invention. Link sizing system 130 includes communication interface 501, processing system 502, and user interface 503. Processing system 502 includes storage system 504. Storage system 504 stores software 505. Processing system 502 is linked to communication interface 501 and user interface 503. Link sizing system 130 could be comprised of a programmed general-purpose computer, although those skilled in the art will appreciate that programmable or special purpose circuitry and equipment may be used. Link sizing system 130 may use a client server architecture where operations are distributed among a server system and client devices that together comprise elements 501-505.

Communication interface 501 is coupled to data links 121-123. Communication interface 501 could comprise a network interface card, modem, port, or some other communication device. Communication interface 501 may be distributed among multiple communication devices. Processing system 502 could comprise a computer microprocessor, logic circuit, or some other processing device. Processing system 502 may be distributed among multiple processing devices. User interface 503 could comprise a keyboard, mouse, voice recognition interface, microphone and speakers, graphical display, touch screen, or some other type of user device. Storage system 504 could comprise a disk, tape, integrated circuit, server, or some other memory device. Storage system 504 may be distributed among multiple memory devices.

Processing system 502 retrieves and executes software 505 from storage system 504. Software 505 may comprise an operating system, utilities, drivers, networking software, and other software typically loaded onto a general-purpose computer. Software 505 could comprise an application program, firmware, or some other form of machine-readable processing instructions. When executed by processing system 502, software 505 directs processing system 502 to operate as described herein for link sizing system 130.

The invention claimed is:

1. A method of sizing a communication link, the method comprising:
   determining daily peak callers and daily calling time for a plurality of days;
   determining a sizing factor that represents a slope of a line formed by plotting the daily peak callers against the daily calling time for the plurality of days;
   determining a peak day calling time;
   multiplying the peak day calling time by the sizing factor to obtain peak day peak callers;
   determining a bandwidth per caller;
   multiplying the peak day peak callers by the bandwidth per caller to determine a peak day peak bandwidth; and
   sizing the communication link to support the peak day peak bandwidth.

2. The method of claim 1 wherein the daily calling time comprises daily calling hours and wherein the peak day calling time comprises peak day calling hours.

3. The method of claim 2 wherein determining the daily peak callers and the daily calling hours for the plurality of days comprises determining the daily peak callers and the daily calling hours for the plurality of days for a communication network.

4. The method of claim 2 wherein determining the daily peak callers and the daily calling hours for the plurality of days comprises determining the daily peak callers and the daily calling hours for the plurality of days for a switching system.

5. The method of claim 2 wherein determining peak day calling hours comprises determining peak day calling minutes.

6. The method of claim 1 wherein the sizing factor is between 0.07 and 0.09.

7. The method of claim 1 wherein determining the sizing factor that represents the slope comprises adjusting the sizing factor upwards from the slope to oversize the communication link.

8. The method of claim 1 wherein sizing the communication link comprises checking an existing size of the communication link.

9. The method of claim 1 wherein the communication link comprises at least one T1 connection.

10. The method of claim 1 wherein the communication link supports internet protocol telephony.

11. A communication network comprising:
    at least one switching system configured for coupling to a communication link and configured to transfer calling data; and
    a link sizing system configured to receive and process the calling data to determine daily peak callers and daily calling time for a plurality of days, determine a sizing factor that represents a slope of a line formed by plotting the daily peak callers against the daily calling time for the plurality of days, determine a peak day calling time, multiply the peak day calling time by the sizing factor to obtain peak day peak callers, determine a bandwidth per caller, and multiply the peak day peak callers by the bandwidth per caller to determine a peak day peak bandwidth, wherein the communication link is sized to support the peak day peak bandwidth.

12. The communication system of claim 11 wherein the daily calling time comprises daily calling hours and wherein the peak day calling time comprises peak day calling hours.

13. The communication system of claim 12 wherein the link sizing system is configured to determine the daily peak callers and the daily calling hours for the plurality of days for the communication network.

14. The communication system of claim 12 wherein the link sizing system is configured to determine the daily peak callers and the daily calling hours for the plurality of days for the switching system.

15. The communication system of claim 12 wherein the link sizing system is configured to determine peak day calling minutes.

16. The communication system of claim 11 wherein the sizing factor is between 0.07 and 0.09.

17. The communication system of claim 11 wherein the link sizing system is configured to adjust the sizing factor upwards from the slope to oversize the communication link.

18. The communication system of claim 11 wherein the link sizing system is configured to check an existing size of the communication link.

19. The communication system of claim 11 wherein the communication link comprises at least one T1 connection.

20. The communication system of claim 11 wherein the communication link supports internet protocol telephony.

21. A computer-readable medium having instructions stored thereon for operating a link sizing system, wherein a communication network comprises at least one switching system configured for coupling to a communication link and configured to transfer calling data to the link sizing system, and wherein the instructions, when executed by the link sizing system, direct the link sizing system to:
    process the calling data to determine daily peak callers and daily calling time for a plurality of days, determine a sizing factor that represents a slope of a line formed by plotting the daily peak callers against the daily calling time for the plurality of days, determine a peak day calling time, multiply the peak day calling time by the sizing factor to obtain peak day peak callers, determine a bandwidth per caller, and multiply the peak day peak callers by the bandwidth per caller to determine a peak day peak bandwidth, wherein the communication link is sized to support the peak day peak bandwidth.

22. The computer-readable medium of claim 21 wherein the daily calling time comprises daily calling hours and wherein the peak day calling time comprises peak day calling hours.

23. The computer-readable medium of claim 22 wherein the computer-readable medium is configured to direct the link sizing system to determine the daily peak callers and the daily calling hours for the plurality of days for the communication network.

24. The computer-readable medium of claim 22 wherein the computer-readable medium is configured to direct the link sizing system to determine the daily peak callers and the daily calling hours for the plurality of days for the switching system.

25. The computer-readable medium of claim 22 wherein the computer-readable medium is configured to direct the link sizing system to determine peak day calling minutes.

26. The computer-readable medium of claim 21 wherein the sizing factor is between 0.07 and 0.09.

27. The computer-readable medium of claim 21 wherein the computer-readable medium is configured to direct the link sizing system to adjust the sizing factor upwards from the slope to oversize the communication link.

28. The computer-readable medium of claim 21 wherein the computer-readable medium is configured to direct the link sizing system to check an existing size of the communication link.

29. The computer-readable medium of claim 21 wherein the communication link comprises at least one T1 connection.

30. The computer-readable medium of claim 21 wherein the communication link supports internet protocol telephony.

* * * * *